(12) United States Patent
Lee et al.

(10) Patent No.: US 8,741,254 B2
(45) Date of Patent: Jun. 3, 2014

(54) METHOD OF PREPARING BUNDLE TYPE SILICON NANOROD COMPOSITE THROUGH ELECTROLESS ETCHING PROCESS USING METAL IONS AND ANODE ACTIVE MATERIAL FOR LITHIUM SECONDARY CELLS COMPRISING THE SAME

(75) Inventors: Joong Kee Lee, Seoul (KR); Byung Won Cho, Seoul (KR); Joo Man Woo, Seoul (KR); Hyung Sun Kim, Seoul (KR); Kyung Yoon Chung, Seoul (KR); Won Young Chang, Seoul (KR); Sang Ok Kim, Seoul (KR); Sang Eun Park, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 848 days.

(21) Appl. No.: 12/535,216

(22) Filed: Aug. 4, 2009

(65) Prior Publication Data

US 2010/0301276 A1     Dec. 2, 2010

(30) Foreign Application Priority Data

May 27, 2009     (KR) .................. 10-2009-0046373

(51) Int. Cl.
*C01B 33/02*     (2006.01)

(52) U.S. Cl.
USPC ........... 423/348; 428/402; 428/613; 438/745; 438/753

(58) Field of Classification Search
CPC . H01L 21/306; H01L 21/30604; C01B 33/02; B82Y 30/00
USPC ................. 428/402, 403, 613; 438/745, 753; 423/348
See application file for complete search history.

(56) References Cited

U.S. PATENT DOCUMENTS

| | | | |
|---|---|---|---|
| 6,790,785 B1 * | 9/2004 | Li et al. .......... | 438/745 |
| 7,244,513 B2 * | 7/2007 | Li et al. .......... | 428/613 |
| 7,514,369 B2 * | 4/2009 | Li et al. .......... | 438/753 |
| 7,531,155 B2 * | 5/2009 | Li et al. .......... | 423/348 |
| 2006/0251562 A1 * | 11/2006 | Farrell et al. .......... | 423/324 |
| 2007/0071787 A1 * | 3/2007 | Saffie et al. .......... | 424/423 |
| 2009/0186267 A1 * | 7/2009 | Tiegs .......... | 429/129 |

FOREIGN PATENT DOCUMENTS

| | | |
|---|---|---|
| DE | 3402072 A   *   8/1985 | |
| KR | 10-2005-0102871 A    10/2005 | |

OTHER PUBLICATIONS

Machine translation of DE 3402072 A.*
Ryu, Ji Heon et al.: "Failure Modes of Silicon Powder Negative Electrode in Lithium Secondary Batteries", *Electrochemical and Solid-State Letters*, 7, (10), 2004, pp. A306-A309.
Chan, Candace K. et al.: "High-performance lithium battery anodes using silicon nanowires", *nature nanotechnology*, vol. 3, Jan. 2008, pp. 31-35.
Ma, Hua et al.: "Nest-like Silicon Nanospheres for High-Capacity Lithium Storage", *Adv. Mater.*, 2007, 19, pp. 4067-4070.
Kim, Hyunjung et al.: "Three-Dimensional Porous Silicon Particles for Use in High-Performance Lithium Secondary Batteries", *Angew. Chem. Int. Ed.*, 2008, 47, pp. 1-5.
Office action issued by Korean Patent Office for counterpart (priority) Korean application 10-2009-0046373 mailed Apr. 20, 2011.

* cited by examiner

*Primary Examiner* — Mark Kopec
*Assistant Examiner* — Haidung Nguyen
(74) *Attorney, Agent, or Firm* — Frommer Lawrence & Haug, LLP; Ronald R. Santucci

(57) ABSTRACT

The present invention relates to a method of preparing a porous silicon nanorod structure composed of columnar bundles having a diameter of 50-100 nm and a length of 2-5 μm, and a lithium secondary cell using the porous silicon nanorod structure as an anode active material. The present invention provides a high-capacity and high-efficiency anode active material for lithium secondary cells, which can overcome the low conductivity of silicon and improve the electrode deterioration attributable to volume expansion because it is prepared by electrodepositing the surface of silicon powder with metal and simultaneously etching the silicon powder partially using hydrofluoric acid.

8 Claims, 4 Drawing Sheets

METHOD OF PREPARING BUNDLE TYPE SILICON NANOROD COMPOSITE THROUGH ELECTROLESS ETCHING PROCESS USING METAL IONS AND ANODE ACTIVE MATERIAL FOR LITHIUM SECONDARY CELLS COMPRISING THE SAME

CROSS-REFERENCE TO RELATED APPLICATION

This application claims the benefit under 35 U.S.C. §119 (a) of Korean Patent Application No. 10-2009-0046373 filed on May 27, 2009, the entire contents of which are incorporated herein by reference.

BACKGROUND OF THE INVENTION

1. Field of the Invention

The present invention relates to a high-capacity anode active material which can improve the discharge capacity and life cycle characteristics of a secondary cell by controlling the shape of silicon particles through an electroless etching process using metal ions and by compounding a metal and carbon into shape controlled silicon, a method of preparing the same, and a secondary cell comprising the same.

2. Description of the Related Art

With the advent of the modern information society, power sources for portable electronics, such as mobile phones, notebook computers, personal digital assistants (PDAs) and the like, have been required to be miniaturized, highly energized and highly densified. Further, nowadays, as the oil crisis is returning, the interest in energy is increasing, and secondary cells used for hybrid electric vehicles (HEV) and the like are increasingly being used. Silicon, which is used as an anode material for lithium secondary cells, is a material replacing a carbon material.

Currently, a commonly-used graphite material has a theoretical electric capacity of 372 mAh/g, whereas silicon has a theoretical electric capacity of about 4200 mAh/g. However, in actuality, when silicon is fabricated into a silicon anode to make a cell, the cell only has a charging capacity of about 3260 mAh/g, a discharge capacity of about 1170 mAh/g and a coulombic efficiency of 35% (Electrochem. Solid State Lett., P.A306, Vol 7, 2004).

Further, when the cell is continuously charged and discharged over 5 cycles, its discharge capacity is rapidly decreased to about 300 mAh/g, which is about 10% of its initial discharge capacity. The reason for this is that, at the time of inserting lithium, a lithium-silicon alloy (Li—Si alloy, $Li_{22}Si_5$) is formed, thus causing a fourfold volume expansion. Owing to this volume expansion, the silicon structure breaks down, so that the electron pathway of an electrode is blocked, with the result that dead volume is formed in the electrode, thus causing the reduction in capacity of the silicon anode. Therefore, as the cell is continuously charged and discharged, its capacity is rapidly decreased. Such a life deterioration phenomenon significantly occurs in a bulk silicon film or particles of micrometers in size.

In order to solve the above problems, various methods have been proposed. For example, silicon was grown on the surface of an electric accumulator in the form of a wire, and was then used as an electrode. This method is advantageous in that electrons move easily compared to a conventional thin film, and the inner stress of silicon occurring at the time of charging and discharging a cell is decreased, thus exhibiting excellent cycle performance, but is disadvantageous in that it cannot be easily put to practical use because it is performed based on a thin film forming process (NATURE Nanotechnology, P. 31, vol 3, 2008).

Further, a method of controlling the shape of silicon nanoparticles has been proposed. In this method, silicon nanoparticles were formed into hollow silicon nanospheres, and thus the weakness of the silicon nanoparticles over cycles was overcome. However, this method is problematic in that the time taken to form the hollow silicon nanospheres is increased, and the process of forming the hollow silicon nanospheres is complicated (Adv. Mater., p. 4067, vol 19, 2007).

Further, Korean Unexamined Patent Application Publication No. 1999-0042566 discloses a method of forming porous silicon used for light-emitting materials by electrochemically etching a silicon wafer. In this method, a silicon wafer is immersed in an etchant, and then electric current is applied thereto to corrode the surface layer of the silicon wafer, thereby forming porous silicon.

Furthermore, a composite of silicon and silica was formed, and then only silica is removed from the composite to form many pores in bulk silicon particles, thereby overcoming the weakness of the bulk silicon particles over cycles. This method is different from a conventional method in the point that pores for alleviating volume expansion occurring in the silicon particles are formed by chemically etching just the silica. However, this method is also problematic in that the time taken to form the pores in the bulk silicon particles is long, the process of forming the pores in the bulk silicon particles is complicated, and a high-temperature heat treatment process must be performed (Angew. Chem. Int. Ed. p. 1, vol 47, 2008).

The present invention is greatly different from this method in the point that silicon particles are only partially etched for a short period of time to prepare a bundle type silicon nanorod structure.

SUMMARY OF THE INVENTION

Accordingly, the present invention has been made keeping in mind the above problems occurring in the prior art, and an object of the present invention is to provide a silicon structure which can stably maintain a cell capacity by preventing the life deterioration of silicon used as an anode active material of a lithium secondary cell, and a method of preparing the same.

An aspect of the present invention provides an anode active material for lithium secondary cells, which can prevent the deterioration of an electrode by forming a space in a silicon anode and thus alleviating the volume expansion of the silicon anode, and which can improve the initial efficiency and cycle performance of a lithium secondary cell by providing larger reaction site for lithium ions and buffer space as well, and a method of preparing the same.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
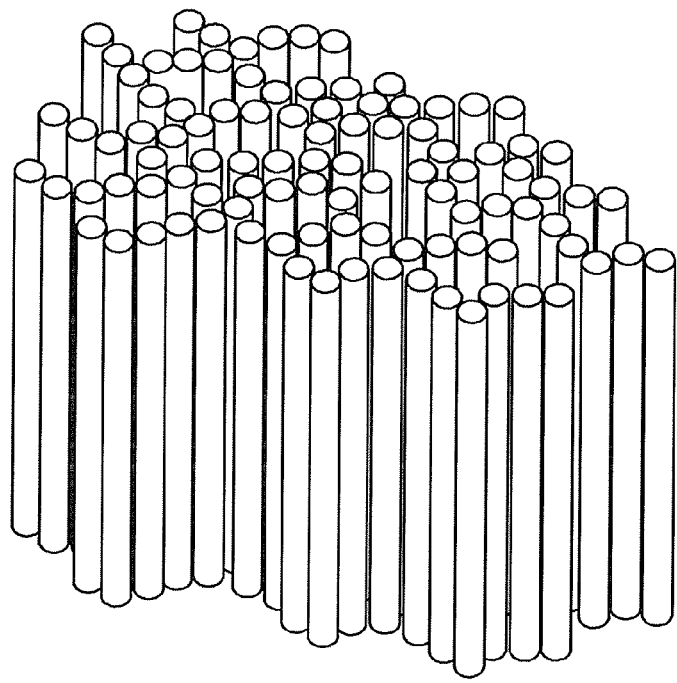
FIG. 1 is a schematic view showing a silicon anode active material according to the present invention.

Hereinafter, preferred embodiments of the present invention will be described in detail with reference to the attached drawings.

In order to accomplish the object, the present invention provides a porous silicon particle (a first structure) whose surface is electrodeposited with metal or a bundle type silicon nanorod structure (a second structure) from which the electrodeposited metal is removed.

An embodiment of the present invention provides a method of preparing a porous silicon particle (a first structure), the surface of which is electrodeposited with metal, comprising the steps of: dissolving metal in an aqueous hydrofluoric acid solution to form a displacement plating solution (step 1); and adding silicon to the displacement plating solution and then stirring the mixture to etch the silicon and electrodeposit the etched silicon with the metal to form a silicon particle (step 2).

In the method, in step 1, the metal may be one or more metals selected from among silver, gold, copper, lead, tin, nickel, cobalt, cadmium, iron, chromium and zinc.

Preferably, the metal is silver.

Further, the aqueous hydrofluoric acid solution may have a concentration of 0.01-10 M.

Preferably, the concentration of metal in the displacement plating solution is 0.001 µM-10 M.

Before the silicon powder is added to the displacement plating solution, the silicon powder may be etched to remove an oxide layer from the surface thereof.

Silicon is etched by hydrofluoric acid included in a solution containing hydrofluoric acid and the metal ions, and simultaneously donates electrons. The metal ions in the solution accept the donated electrons to be reduced into metal, and the metal is electrodeposited on the surface of the silicon. Once the metal is electrodeposited on the surface of the silicon, the metal is continuously deposited thereon because the electrodeposited metal serves as a catalytic site, and the silicon is etched only around the electrodeposited site, thus forming a pore having a long channel. Therefore, the concentration of hydrofluoric acid and the concentration of metal play a very important part in the formation of a pore in silicon.

In the step of forming the displacement plating solution, the concentration of the aqueous hydrofluoric acid solution may be 0.01-10 M, preferably 0.1-5 M. The metal precursor to be used to coat the silicon may include Au, Ag, Cu, Pb, Sn, Ni, Co, Cd, Fe, Cr, Zn and the like. Considering the standard reduction potential (−1.2V) of silicon, among the compounds including the metals, compounds including metals having a positive standard reduction potential of more than −1.2V can be used as the metal precursor of silicon, and, preferably, a compound including Ag may be used as the metal precursor of silicon.

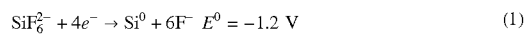

Total reaction may be represented by Reaction Formula (3) below.

The metal reduced through the series of reactions, represented by Reaction Formulae (1), (2) and (3) above, is electrodeposited on the surface of silicon.

In this case, the concentration of the metal precursor may be 0.001 µM-1M, preferably, 1-100 ∞M.

The temperature of the displacement plating solution may be in a range of from 5° C. to 100° C., and the stirring of the displacement plating solution including silicon may be rapidly performed in order to prevent the gas generated by displacement plating from floating particles.

Another embodiment of the present invention provides a method of preparing a porous silicon particle (a second structure), comprising the steps of: dissolving metal in an aqueous hydrofluoric acid solution to form a displacement plating solution (step 1); adding silicon to the displacement plating solution and then stirring the mixture to etch the silicon and electrodeposit the etched silicon with the metal to form a silicon particle (step 2); and etching the metal electrodeposited on the silicon particle (step 3).

In the method, the second structure can be obtained by chemically etching only the metal electrodeposited on the first structure. Specifically, the first structure passes through a filter to remove a reaction solution therefrom, is washed with 1000 mL of distilled water to remove unreacted impurities using a filter paper, and is then immersed in a 30% aqueous nitric acid solution for 30 minutes to completely remove the Ag electrodeposited on the surface of the first structure, thereby obtaining the second structure.

Still another embodiment of the present invention provides a porous silicon particle whose surface is electrodeposited with metal or a porous silicon particle from which the electrodeposited metal was removed.

Silicon, which is used as an anode material for lithium secondary cells, is a material replacing a carbon material. Currently, a commonly-used graphite material has a theoretical electric capacity of 372 mAh/g, whereas silicon has a theoretical electric capacity of about 4200 mAh/g. However, in actuality, when silicon is fabricated into a silicon anode to make a cell, the cell only has a charging capacity of about 3260 mAh/g, a discharge capacity of about 1170 mAh/g and a coulombic efficiency of 35%.

Further, when the cell is continuously charged and discharged over 5 cycles, its electric capacity is rapidly decreased to about 300 mAh/g, which is about 10% of its initial electric capacity. The reason for this is that, at the time of inserting lithium, a lithium-silicon alloy (Li—Si alloy, Li22Si5) is formed, thus causing a fourfold volume expansion. Owing to this volume expansion, the silicon structure breaks down, so that the electron pathway of an electrode is blocked, with the result that dead volume is formed in the electrode, thus causing the reduction in capacity of the silicon anode. Therefore, as the cell is continuously charged and discharged, its capacity is rapidly decreased. Such a life deterioration phenomenon clearly occurs in a bulk silicon film or particles of micrometers in size.

According to the bundle type silicon nanorod structure of the present invention, since it has large pore volume and surface area, the anode deterioration attributable to the volume expansion of silicon at the time of charging and discharging is prevented, and the reaction area of the silicon nanorod structure and lithium is increased, thus improving the initial efficiency and cycle performance of a lithium secondary cell.

The silicon nanorod structure of the present invention can be used for lithium secondary cells. As an organic binder of the porous silicon anode active material synthesized through the above processes, a polymer solution including N-methyl-pyridone (NMP) and 5% of poly vinylidene fluoride (PVdF) is used. 15% by weight of carbon black, serving as a conductive material, is added to an electrode including 70% by weight of an anode active material and 15% by weight of an organic binder in order to decrease the resistance of the electrode. In this case, a pure organic NMP solvent is suitably added according to the weight of the mixture, and then stirred at a high rotation speed of 5000 rpm for 30 minutes to obtain a slurry having appropriate viscosity. Subsequently, the slurry is applied onto a copper thin film having a thickness of 10 μm, which is a metal material for an electricity accumulator, to a predetermined thickness using a doctor blade method, thereby manufacturing an anode.

Hereinafter, the present invention will be described in detail with reference to the following examples in which a silicon anode and a half lithium cell are fabricated and then the performance thereof was tested. A better understanding of the present invention may be obtained through the following examples which are set forth to illustrate, but are not to be construed as the limit of the present invention.

EXAMPLES

Example 1

Preparation of a Silcon Anode Active Material Electrodeposited with Silver 6.14 g of $AgNO_3$ and 87 mL of HF (48-52%) were mixed in 813 mL of distilled water, and then stirred for about 10 minutes to form a mixed solution. Subsequently, 100 mL of distilled water and 2 g of silicon powder (ca. 2.5 μm, manufactured by Kojundo Corp.) were put into a reactor and then ultrasonically dispersed, and then the mixed solution was put into the reactor and then stirred for 1 hour to obtain particles. The obtained particles were passed through a filter to remove the reaction solution, and then washed with 1000 mL of distilled water to remove unreacted impurities therefrom using filter paper.

Example 2

Preparation of a Silicon Anode Active Material from which Electrodeposited Silver is Removed 6.14 g of $AgNO_3$ and 87 mL of HF (48-52%) were mixed in 813 mL of distilled water, and then stirred for about 10 minutes to form a mixed solution. Subsequently, 100 mL of distilled water and 2 g of silicon powder (ca. 2.5 μm, manufactured by Kojundo Corp.) were put into a reactor and then ultrasonically dispersed, and then the mixed solution was put into the reactor and then stirred for 1 hour at 5° C.-100° C. to proceed reduction/oxidation reactions from (1) to (3) on the surface of the silicon particles. Under the experimental range, the pore diameter decreases with the increase of reaction temperature and vice versa. The reaction temperature, therefore, affect affects the surface morphology of the silicon. The obtained particles were passed through a filter to remove the reaction solution, and then washed with 1000 mL of distilled water to remove unreacted impurities therefrom using filter paper. Subsequently, the washed particles were immersed in a 30% nitric acid solution for 30 minutes to completely remove Ag electrodeposited on the surface thereof.

Comparative Example 1

Silicon Powder as an Anode Active Material

Silicon powder (ca. 2.5 μm, manufactured by Kojundo Corp.) was provided as an anode active material.

Example 3

Manufacture of an Anode

Anodes were manufactured using the silicon anode active materials prepared in Examples 1 and 2 and the silicon powder of Comparative Example 1, respectively.

As an organic binder of the silicon anode active materials prepared in Examples 1 and 2 and the silicon powder of Comparative Example 1, a polymer solution including N-methyl-pyridone (NMP) and 5% of poly vinylidene fluoride (PVdF) was used. 15% by weight of carbon black, serving as a conductive material, was added to an electrode including 70% by weight of the silicon anode active material and 15% by weight of the organic binder in order to decrease the resistance of the electrode. In this case, a pure organic NMP solvent was added to the mixture including the silicon anode active material, organic binder and conductive material such that its weight is a half of the weight of the mixture, and then stirred at a high rotation speed of 5000 rpm for 30 minutes to obtain a slurry having appropriate viscosity. Subsequently, the slurry was applied onto a copper thin film, which is a metal material for an electricity accumulator, to a thickness of 200 μm using a doctor blade method, thereby manufacturing the anodes.

Example 4

Manufacture of a Half Cell Including the Silicon Anode Active Material

Half cells including the silicon anode active materials prepared in Examples 1 and 2 and the silicon powder of Comparative Example 1 were manufactured, respectively. The respective anodes manufactured in Example 3 were rolled, dried in a vacuum oven for 12 hours and then used. A laminate including the dried anode, a polypropylene separator and a lithium-metal counter electrode was formed, and then the laminate was immersed in a solution in which 1 M of $LiPF_6$ was dissolved in EC+EMC+DMC (1:1:1), serving as an electrolyte, and then vacuum-packaged using an aluminum pouch to manufacture the half cells.

Example 5

Manufacture of an Anode Using CMC

Aqueous CMC (carboxylmethyl cellulose) was used to manufacture an anode instead of the organic polymer solution generally used to manufacture an anode using the silicon powder prepared in Example 1. CMC serves to improve viscosity in an aqueous system, and, particularly, a carboxylic group present in the CMC can improve the dispersibility of silicon in an aqueous slurry because it can be easily chemically adsorbed on the surface of partially-oxidized silicon. Thus, CMC can be more suitably used to manufacture an anode.

Figure 5:
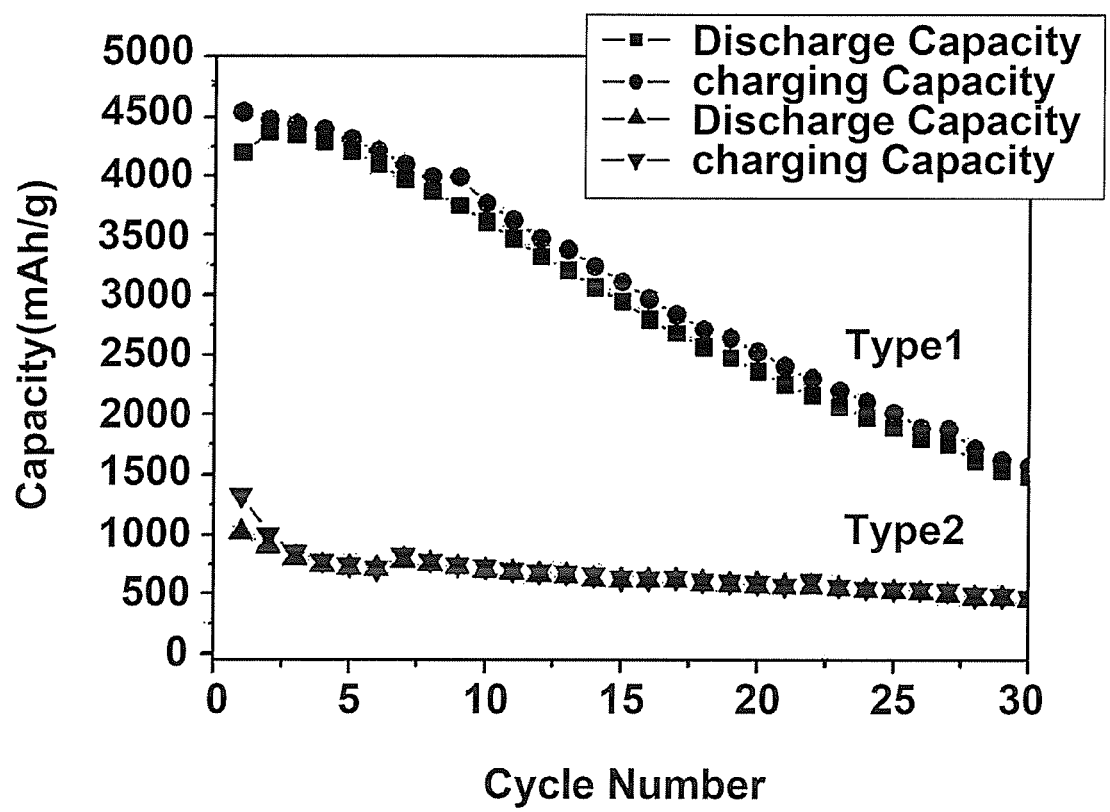
FIG. 5 is a graph showing the life cycle characteristics of a cell including a silicon nanostructure prepared in Example 5 and a cell including a silicon nanostructure active material prepared in Example 4.

A mixture including 33% by weight of a silicon anode active material, 33% by weight of CMC, which is a thickener, and 33% by weight of carbon black, which is a conductive material used to decrease the resistance of an electrode, was formed. Subsequently, purified water was suitably added to the mixture according to the weight of the mixture, and then stirred at a high rotation speed of 5000 rpm for 30 minutes to obtain a slurry having appropriate viscosity. Subsequently, the slurry was applied onto a copper thin film having a thickness of 10 μm, which is a metal material for an electricity accumulator, to a predetermined thickness using a doctor blade method, thereby manufacturing an anode. In the present invention, the anode manufactured in this way is referred to as 'type 1'. FIG. 5 shows cycle data of a half cell including the type 1.

Example 6

Preparation of an Anode Material Coated with Carbon and Manufacture of an Anode Using the Anode Material The silicon nanoparticle obtained in Example was coated with a carbon layer. 9 g of polyvinyl alcohol (PVA) was mixed with 100 mL of distilled water, stirred and then heated to 80-90° C. to form a solution. Subsequently, 1 g of the silicon powder prepared in Example 1 was added to the solution, and then distilled water was slowly vaporized for 3 hours to obtain a viscous solution. Then, this viscous solution was dried in an oven at 80° C. overnight to obtain a silicon-containing vinyl intermediate.

The intermediate was cut in small sizes, and then baked at 900° C. for 2 hours under an argon (Ar) atmosphere to completely carbonize polyvinyl alcohol, thereby obtaining a black silicon-carbon composite. Subsequently, the silicon-carbon composite was pulverized using a mortar to 1.0 g of porous silicon composite powder coated with a carbon layer. As an organic binder of the porous silicon composite prepared in this way, a polymer solution including N-methyl-pyridone (NMP) and 5% of poly vinylidene fluoride (PVdF) was used. 15% by weight of carbon black, serving as a conductive material, was added to an electrode including 70% by weight of the anode active material and 15% by weight of the organic binder in order to decrease the resistance of the electrode. In this case, a pure organic NMP solvent was added to the mixture including the anode active material, organic binder and conductive material such that its weight is half of the weight of the mixture, and then stirred at a high rotation speed of 5000 rpm for 30 minutes to obtain a slurry having appropriate viscosity. Subsequently, the slurry was applied onto a copper thin film to a thickness of 200 μm using a doctor blade method, thereby manufacturing an anode. In the present invention, the anode manufactured in this way is referred to as 'type 2'.

Example 7

Manufacture of Cells Including Anodes Prepared by Examples 5 and 6

Cells including anodes manufactured in Examples 5 and 6 were manufactured. A mixture including 5.7 g of $LiCoO_2$, 0.6 g of acetylene black, 0.4 g of PVdF and 8 g of NMP was stirred at a high rotation speed of 5000 rpm for 30 minutes to obtain a slurry. Subsequently, the slurry was applied onto a copper thin film, which is a metal material for an electricity accumulator, to a thickness of 200 μm using a doctor blade method, thereby manufacturing a $LiCoO_2$ anode. Thereafter, a laminate including the anode manufactured in examples 5 and 6, a polypropylene separator and the $LiCoO_2$ anode was formed, and then the laminate was immersed in a solution in which 1 M of $LiPF_6$ was dissolved in EC+EMC+DMC (1:1:1), serving as an electrolyte, and then vacuum-packaged using an aluminum pouch to manufacture a cell.

Experimental Example 1

SEM Measurement of a Silicon Anode Active Material

Figure 2:
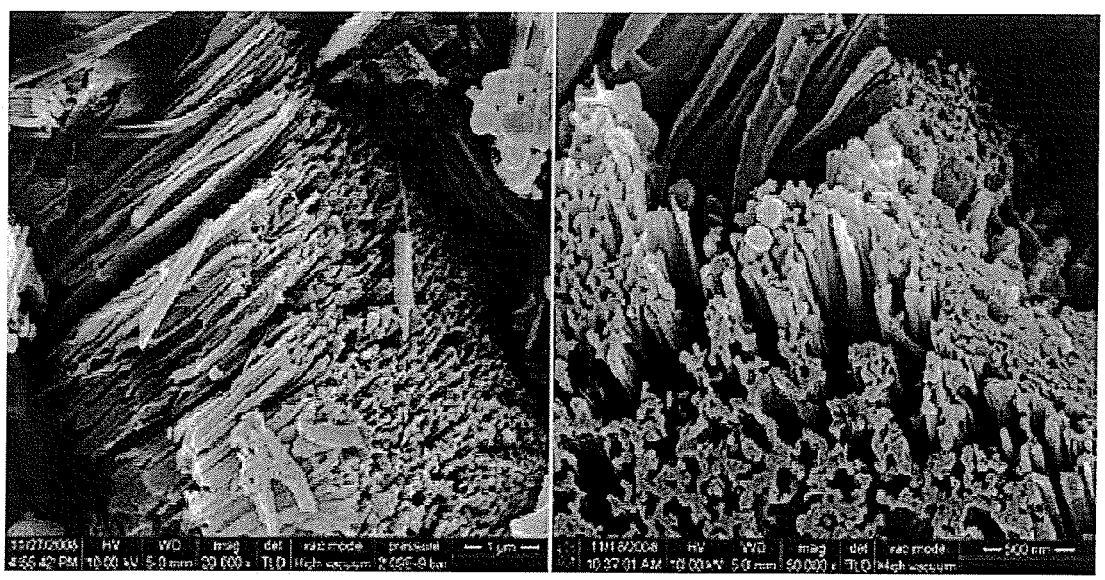
FIG. 2 shows scanning electron micrographs of a silicon anode active material prepared in Example 2.

Silicon from which silver was removed, prepared in Example 2, was measured using a scanning electron microscope (SEM), and the result thereof was shown in FIG. 2.

FIG. 2 shows scanning electron micrographs of a silicon structure from which electrodeposited silver was removed. From FIG. 2, it can be seen that the silicon structure is composed of columnar bundles having a diameter of 50-100 nm and a length of 2-5 μm.

Experimental Example 2

XRD Measurement of a Silicon Anode Active Material

Figure 3:
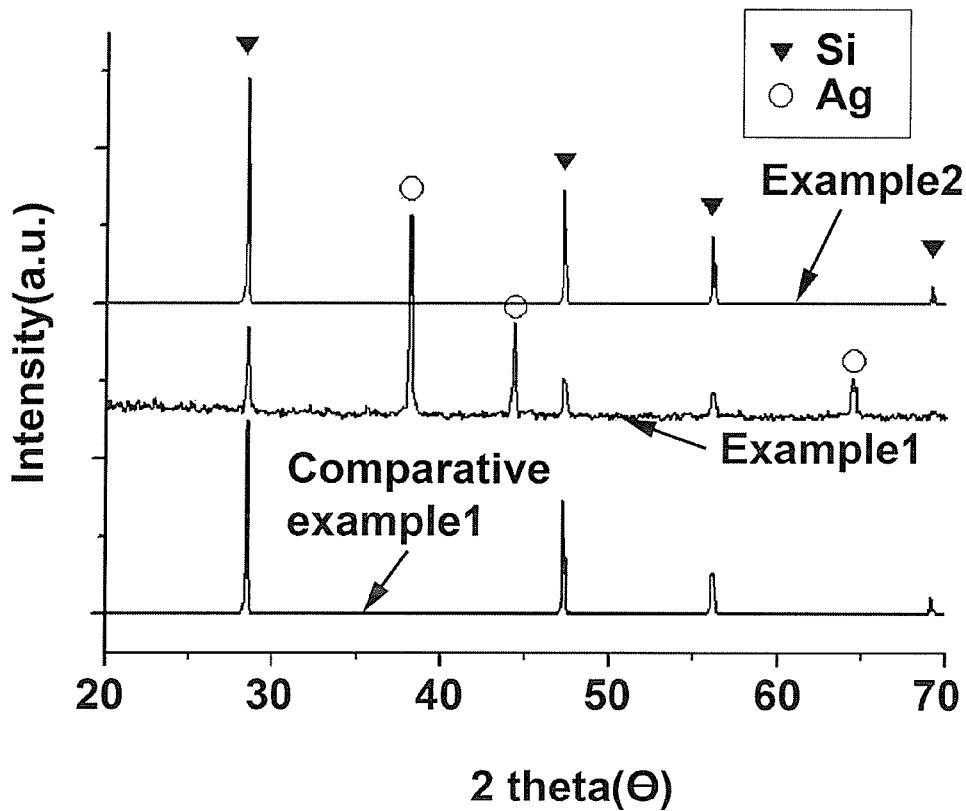
FIG. 3 is a graph showing the X-ray diffraction patterns of silicon anode active materials prepared in Examples 1 and 2 and an untreated silicon anode active material of Comparative Example 1.

The X-ray diffraction (XRD) of the silicon particles prepared in Examples 1 and 2 and Comparative Example 1 was measured, and the results thereof were shown in FIG. 3. From FIG. 3, it can be seen that the XRD of the bundle type silicon nanorod structure was identical to that of untreated silicon particle and thus a Ag composite was completely removed.

Experimental Example 3

Measurement of Charge and Discharge Capcities of Cells Including Silicon Anode Active Materials The charging and discharging efficiencies of the cells manufactured in Example 4 including the silicon anode active materials prepared in Examples 1 and 2 and Comparative Example 1 were measured. The charging and discharging of the cells were performed under the condition that static current was charged into a lithium (Li) electrode at a current flow rate of 100 mA per 1 g of silicon anode active material until the potential reached 0 V and was discharged from the lithium (Li) electrode at a current flow rate of 100 mA per 1 g of silicon anode active material until the potential reached 2 V.

Figure 4:
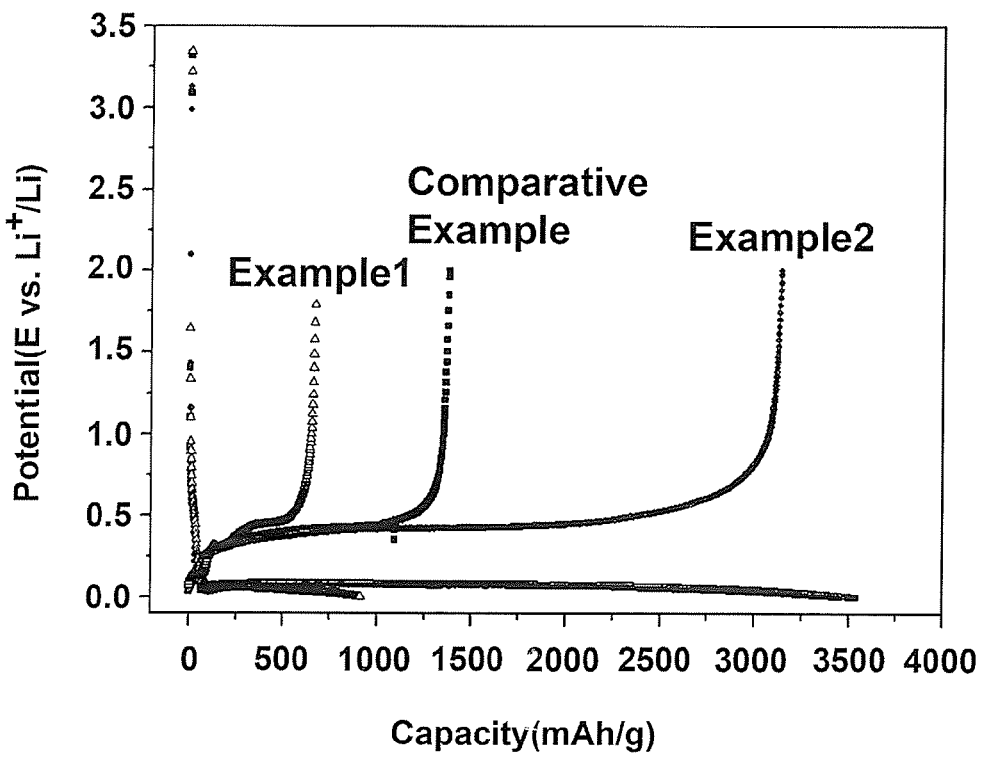
FIG. 4 is a graph showing the charging and discharging curves of cells including silicon anode active materials prepared in Examples 1 and 2 and a cell including an untreated silicon anode active material of Comparative Example 1.

From FIG. 4, it can be seen that surface-treated porous silicon powder has an initial charging capacity of 3464 mAh/g, an initial discharge capacity of 3140 mAh/g and a coulombic efficiency of 91%. Further, it can be seen that the bundle type silicon nanorod powder has very high charging and discharging efficiencies compared to untreated pure silicon powder (intrinsic silicon), which is a control group, having an initial charging capacity of 3525 mAh/g, an initial discharge capacity of 1380 mAh/g and a coulombic efficiency of 39%. Furthermore, it can be seen that the difference in charging capacity per unit mass does not appear regardless of an etching process.

Meanwhile, the cycle performances of samples are given in Table 1. From Table 1, it can be seen that the cycle performance of the cell made of the surface-treated porous silicon powder of the present invention is more excellent than that of the conventional untreated pure silicon powder.

TABLE 1

| Class. | Comp. Exp. 1 | Exp. 1 | Exp. 2 |
|---|---|---|---|
| Charging capacity during a first cycle* | 3465 | 913 | 3464 |
| Discharge capacity during a first cycle | 1299 | 671 | 3140 |
| Coulombic efficiency (%) | 37 | 73 | 91 |
| Capacity fading rate** | 192 | 46 | 96 |

*Capacity per unit mass [mAh/g]
**Capacity fading rate: average discharge capacity decrement per cycle [mAh/g · cycle] until coulombic efficiency (QE) reaches 97%.

Experimental Example 4

Measurement of Charging and Discharging Cycles of a Half Cell

Charging and discharging tests were conducted during 30 cycles using the half cell manufactured in Example 4 using the anodes (type 1 and type 2) manufactured in Examples 5 and 6 under the same conditions as in Experimental Example 3, and thus the capacity changes thereof were measured, and the results thereof are shown in FIG. 5. From FIG. 5, it can be seen that a silicon anode can be manufactured using aqueous CMC through the charging and discharging cycle data of the half cell manufactured using type 1 manufactured using aqueous CMC.

Further, it can be seen that the initial capacity of type 2, which was manufactured by coating the silicon anode active material prepared in Example 3 with a carbon layer, is smaller than that of type 1, but the discharge capacity reduction rate thereof can be greatly decreased.

Experimental Example 5

Examination of Electrode Capacity and Cycle Life Based on a Cathode

The electrode capacity and cycle life of the cell manufactured in Example 7 were examined at a current intensity of C/3 in a potential range of 4.2-3.0 V based on the capacity of a cathode.

Figure 6:
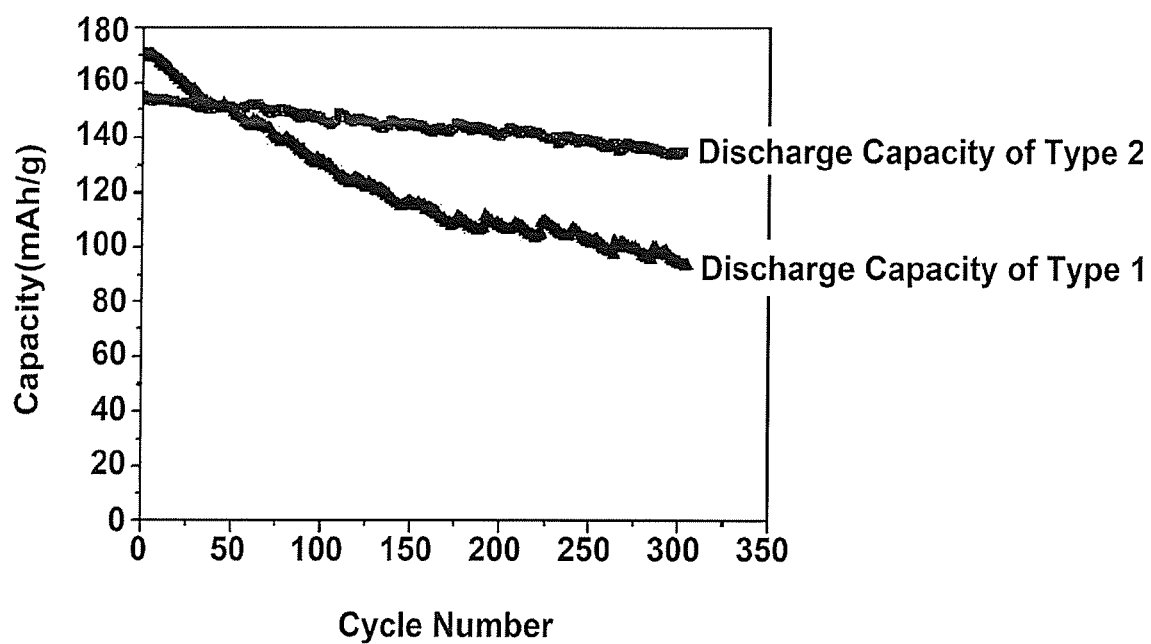
FIG. 6 is a graph showing the changes in discharge capacity with respect to number of cycles for type 1 and type 2, each of which is a nanorod structure prepared in Example 7.

FIG. 6 shows the electrode capacities (based on $LiCoO_2$) and cycle characteristics of the lithium secondary cells manufactured by the above methods. The electrode capacity and cycle characteristics of the type 1 manufactured in Example 5 were compared with those of the type 2 manufactured in Example 6, and the results thereof are shown in FIG. 6. From FIG. 6, it can be seen that the electrode capacities and cycle characteristics of the type 1 and type 2 are similar to those of half cells.

From FIG. 6, it can be seen that the initial discharge capacity of the cell manufactured using the type 1 is somewhat higher than that of the cell manufactured using the type 2, but the capacity fading rate of the cell manufactured using the type 1 is faster than that of the cell manufactured using the type 2 and the discharge capacity of the cell manufactured using the type 1 is thus lower than that of the cell manufactured using the type 2 after 60 cycles, and continuously decreased after this. However, it can be seen that the initial discharge capacity of the type 2 is low, but is continuously maintained regardless of continuous cycles.

As described above, the bundle type silicon nanorod structure of the present invention is advantageous in that it has a large pore volume and a large surface area, so that the anode deterioration attributable to the volume expansion of silicon at the time of charging and discharging is prevented, and the reaction area of the silicon nanorod structure and lithium is increased, thus improving the initial efficiency and cycle performance of a lithium secondary cell.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of preparing a porous silicon particle comprising the steps of:
    dissolving metal in an aqueous hydrofluoric acid solution to form a displacement plating solution;
    adding silicon to the displacement plating solution and then stirring the mixture to etch the silicon and electrodeposit the etched silicon with the metal to form a silicon particle; and
    etching the metal electrodeposited on the silicon particle to remove the metal from the silicon to form a porous silicon particle with a bundle type silicon nanorod structure.

2. The method according to claim 1, wherein, in dissolving the metal in the aqueous hydrofluoric acid solution, the metal is one or more metals selected from the group consisting of silver, gold, copper, lead, tin, nickel, cobalt, cadmium, iron, chromium and zinc.

3. The method according to claim 2, wherein the metal is silver.

4. The method according to claim 1, wherein the aqueous hydrofluoric acid solution has a concentration of 0.01-10 M.

5. The method according to claim 1, wherein the metal in the displacement plating solution has a concentration of 0.001 µM-10 M.

6. A porous silicon particle prepared by the method of claim 1.

7. The method of claim 1, wherein the aqueous hydrofluoric acid solution has a concentration of 0.01-10 M, the aqueous hydrofluoric acid solution has reaction temperature of 5-100° C. and the metal in the displacement plating solution has a concentration of 0.001 nM-1 M.

8. The porous silicon particle of claim 6, wherein the particle has columnar bundles having a diameter of 50-100 nm and a length of 2-5 µm.

* * * * *